US012471835B1

(12) United States Patent
Rabinovich

(10) Patent No.: US 12,471,835 B1
(45) Date of Patent: Nov. 18, 2025

(54) METHODS AND SYSTEMS FOR DETECTION AND DIFFERENTIATION OF TUMORS

(71) Applicant: Joshua E. Rabinovich, Hod Hasharon (IL)

(72) Inventor: Joshua E. Rabinovich, Hod Hasharon (IL)

( * ) Notice: Subject to any disclaimer, the term of this patent is extended or adjusted under 35 U.S.C. 154(b) by 167 days.

(21) Appl. No.: 18/236,281

(22) Filed: Aug. 21, 2023

Related U.S. Application Data

(60) Provisional application No. 63/399,780, filed on Aug. 22, 2022.

(51) Int. Cl.
*A61B 5/00* (2006.01)
*A61B 5/05* (2021.01)
*G01S 7/02* (2006.01)
*G01S 7/41* (2006.01)

(52) U.S. Cl.
CPC .............. *A61B 5/4312* (2013.01); *A61B 5/05* (2013.01); *G01S 7/025* (2013.01); *G01S 7/412* (2013.01)

(58) Field of Classification Search
CPC .... A61B 5/00; A61B 5/05; G01S 7/02; G01S 7/41
See application file for complete search history.

(56) References Cited

U.S. PATENT DOCUMENTS

2010/0036240 A1* 2/2010 Ismail ................. A61B 5/0035
600/425

* cited by examiner

*Primary Examiner* — Michael T Rozanski
(74) *Attorney, Agent, or Firm* — Fresh IP PLC; Clifford D. Hyra; Aubrey Y. Chen

(57) ABSTRACT

Disclosed herein is a method and apparatus for cancer detection and diagnosis by amplification of a reflected signal from the tissue of interest. Specifically, a linearly polarized EM beam travels above the tested area and enters the tested area curvature at a zero incidence angle. The detected tumor's size is correlated with the area under the reflected signal's curve, which depends on size and depth inside the tested body. The amplitude of the reflected signal depends on an angle (θ), unique to each type of tissue, between the plane of the linearly polarized EM beam and its vector of velocity. A method is also disclosed that includes conducting a background scan, scanning at the angle (θ-m) determined for the malignant tumor's tissue, and scanning at the angle (θ-b) determined for the benign tumor's tissue. Amplitude differences between the malignant or benign scans and the background scans indicates the discovered tumor.

30 Claims, 10 Drawing Sheets
(2 of 10 Drawing Sheet(s) Filed in Color)

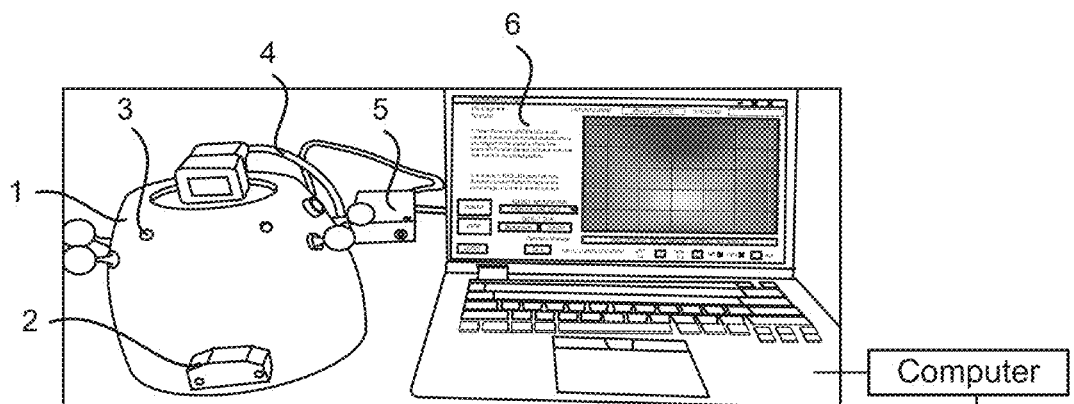
FIG. 1
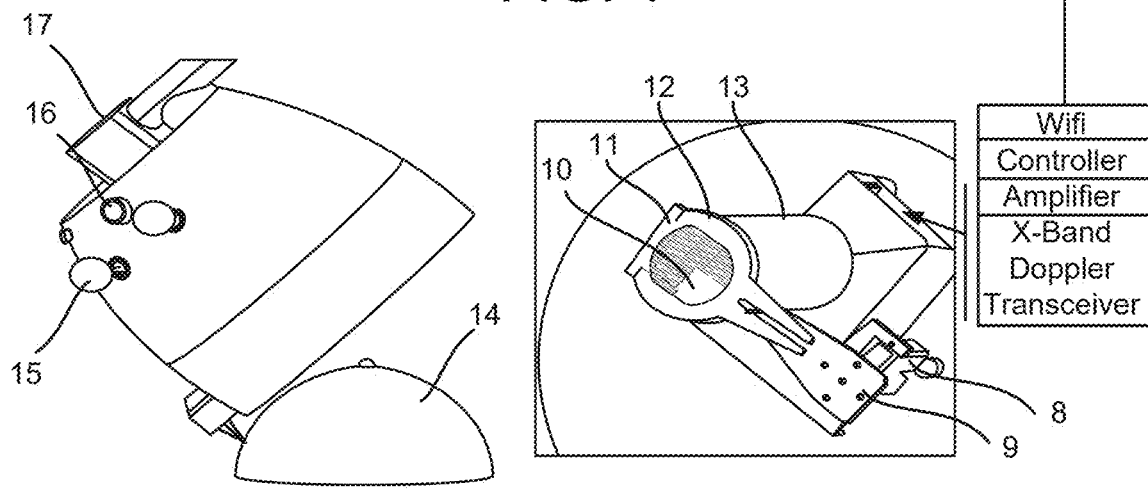
FIG. 2
FIG. 3

| Malignant Tumor Equation e54,θ=20 deg. | | | | | | | | | |
|---|---|---|---|---|---|---|---|---|---|
| A (u^2) | 39 | 34 | 30 | 27 | 23.5 | 20 | 15 | 13.1 | 8.71 | 5 |
| equiv Dia (mm) | 6.6 | 6.42 | 6.25 | 6.1 | 5.9 | 5.62 | 5.12 | 4.85 | 4.15 | 3.4 |

METHODS AND SYSTEMS FOR DETECTION AND DIFFERENTIATION OF TUMORS

CROSS-REFERENCE TO RELATED APPLICATION

This application claims priority to provisional application No. 63/399,780, filed Aug. 22, 2022, which is hereby incorporated by reference in its entirety.

FIELD

The disclosure relates generally to medical diagnostic devices and, more particularly, to a radar-based microwave reflective tomography. This disclosure also related generally to radar-based detection and differentiation of materials having different dielectric characteristics.

BACKGROUND

The main goal for a breast cancer screening methodology is to determine the presence of cancerous tissue at the earliest stage of development. The most common clinical imaging and detection modalities used for breast cancer detection today are: X-ray mammography, magnetic resonance imaging (MRI), and ultrasound scanning.

Mammograms are X-rays images of a compressed breast, and are acknowledged to be the leading method of breast imaging currently available. Mammograms require interpretation by radiologists who can spot cancers between five and ten millimeters in diameter and the prognosis is excellent in those cases. However, about ten to fifteen percent of tumors of this size and most tumors below this size are not detected.

One of the studies revealed major clinical disagreements for about one-third of the same mammograms that were interpreted by a group of radiologists. While mammography is very sensitive to lesions in the breast, it has acknowledged limitations. For example, mammograms create images of the breast based on density differences and there may be only a slight difference in density between normal tissue and tumors. This is especially problematic for imaging women with dense breasts, which comprise a significant portion of the population.

Microwave imaging technology is attractive as an alternative to X-Ray mammography solution for breast cancer detection because of its safe, non-ionizing, low power microwave screening. The microwave technology is also allowing for a shorter screening time while lowering the costs of equipment and screening as compared to mammography, ultrasound and MRI.

Microwave imaging exploits the dielectric contrast between normal and malignant breast tissue at microwave frequencies. It is known that most of all breast cancers originate in globules and ducts which are surrounded with the glandular tissues of the breast. The dielectric permittivity difference between malignant and glandular tissues is only about 11%. This relatively small difference in dielectric properties became a main challenge in detecting and differentiating the reflected-scattered signal from malignant or healthy tissues. In addition, the received tumor reflected signal is affected by a strong skin backscatter, which makes the detection of a desired tumor signal even harder.

Several approaches to microwave breast imaging have been proposed, including transmission and reflection radar-based tomography methods. Transmission tomography reconstructs the distribution of the electrical properties in the breast using measurements of energy transmitted through the breast. Radar-based approaches detect strongly reflecting objects (tumors) using measurements of energy reflected from the breast.

The basic aim of conventional reflection tomography is to construct a quantitative cross-sectional image from reflection data. The transmitted microwave energy illuminates a tissue within the body and an image is formed by displaying the reflected signal as a function of time and direction of the beam. A typical microwave breast imaging system employs multiple antennas which are operating in the near-field region and are placed closely, in a specific array configuration, around the breast of a patient. Transmitting antennas are sequentially selected to illuminate the breast with microwave pulses. Reflections and backscattered signals are then collected by receiver antennas. The obtained data is then pre-processed and used for image reconstruction.

The conventional radar based tomography approach is usually performed iteratively and can be represented by a nonlinear inverse problem that requires significant computational resources for producing the dielectric properties of the breast needed for reliable tumor detection.

Given the foregoing, there exists a significant need for improved methods and devices for detecting breast cancer.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

It is an object of some embodiments of the invention to provide a method of detection and differentiation of tumors in tissue, the method including:

a. providing a Doppler radar, the Doppler radar being movable over tissue of a patient;
b. the Doppler radar emitting a linearly polarized EM energy beam directed at the tissue, the energy beam having an energy beam polarization plane at an angular orientation ($\theta$) in relationship to the velocity vector of the energy beam;
c. the energy beam polarization plane being set to a first angular orientation ($\theta$-1) determined to result in maximum reflection from a malignant tumor;
d. the Doppler radar receiving a reflected signal from the tissue and identifying a region of the tissue having relatively higher reflectivity as a potential malignant tumor;
e. changing the angular orientation of the energy beam's polarization plane to a second angular orientation ($\theta$-2) determined to result in maximum reflection from benign tumors;
f. directing the energy beam at the second angular orientation ($\theta$-2) and at the region identified with the energy beam polarization set to the first angular orientation ($\theta$-1) as the potential malignant tumor;
g. the Doppler radar receiving a reflected signal from the energy beam at the second angular orientation ($\theta$-2) directed at the potential malignant tumor;
h. determining whether a strength (Z) of the reflected signal from the energy beam at the second angular orientation ($\theta$-2) directed at the potential tumor is greater than a strength (Y) of the reflected signal from the energy beam at the first angular orientation (θ-1) directed at the potential malignant tumor; and i. when Z>Y, determining that the potential malignant tumor is a benign tumor, and when Y>Z, determining that the potential malignant tumor is a malignant tumor.

It is another object of some embodiments of the invention to provide a method further comprising moving the Doppler radar back and forth linearly over the tissue of the patient.

It is another object of some embodiments of the invention to provide a method further comprising rotating the Doppler radar over the tissue of the patient.

It is another object of some embodiments of the invention to provide a method where the Doppler radar is provided on a scanner and rotating the Doppler radar comprises rotating the Doppler radar about an axis of symmetry of the scanner.

It is another object of some embodiments of the invention to provide a method where a movable optics-guiding device is provided on the waveguide, where the movable optics-guiding device changes a focus of the energy beam for determining the depth of the potential tumor in the tissue.

It is another object of some embodiments of the invention to provide a method further including adjusting a focal distance of the energy beam while the energy beam is directed at the potential tumor and determining a depth of the potential tumor based on a strength of the reflected signal received at different focal distances of the energy beam.

It is another object of some embodiments of the invention to provide a method where the first angular orientation (θ) is determined by directing the energy beam towards a known volume of material mimicking malignant tumor tissue while varying θ over a range of angles, measuring strength of the reflected signal, and selecting an angle corresponding to the strongest reflection signal.

It is another object of some embodiments of the invention to provide a method where the second angular orientation (θ) is determined by directing the energy beam towards a known volume of material mimicking benign tumor tissue while varying θ over a range of angles, measuring strength of the reflected signal, and selecting an angle corresponding to the strongest reflection signal.

It is another object of some embodiments of the invention to provide a method further including providing a device for the attenuation of microwave reflections from the surfaces inside the scanner's enclosure, the reflections creating a background noise that reduces the system's signal-to-noise ratio.

It is another object of some embodiments of the invention to provide a method where the device for the attenuation of microwave reflections comprises two dielectric parallel plates spread apart a distance equal to one quarter of a wavelength of a source of the EM energy beam.

It is another object of some embodiments of the invention to provide a method where the scanner is maintained perpendicular to the tissue while directing the energy beam at the tissue.

It is another object of some embodiments of the invention to provide a method where the scanner is maintained perpendicular to the tissue by providing a scanner positioning device which directs three red lasers to a common dot when the scanner is maintained perpendicular to the tissue at an appropriate distance, and no common dot is maintained when the scanner is not perpendicular to the tissue.

It is another object of some embodiments of the invention to provide a method further including providing a patient folder to collect data for a patient, the data including data on the tumor in the tissue of the patient and data on the detection and differentiation of tumors in tissue of the patient.

It is another object of some embodiments of the invention to provide a method further including directing the energy beam at a portion of the tissue least expected to have a tumor and receiving the reflected signal from this portion of the tissue to establish a background noise level, and identifying the region of the tissue having relatively higher reflectivity based on the region having a reflected signal at least 10% greater than the background noise level.

It is another object of some embodiments of the invention to provide a method further including subtracting the background noise level from reflected signals from the potential malignant tumor.

It is another object of some embodiments of the invention to provide a method where the Doppler radar is a Doppler transceiver.

It is another object of some embodiments of the invention to provide a method further including providing a linear polarizer through which the energy beam passes, wherein the linear polarizer is rotated to set the angular orientation of the energy beam polarization plane.

It is another object of some embodiments of the invention to provide a method where the linear polarizer is provided at the end of a waveguide.

It is another object of some embodiments of the invention to provide a method where the Doppler radar is rotatable about its axis, wherein the Doppler radar, emitting the linearly polarized energy beam, is rotated to set the angular orientation (θ) of the energy beam polarization plane.

It is another object of some embodiments of the invention to provide a method where the first angular orientation (θ-1) resulting in maximum reflection from a malignant tumor is determined experimentally.

It is another object of some embodiments of the invention to provide a method where the first angular orientation (θ-1) resulting in maximum reflection from a malignant tumor is determined theoretically.

It is another object of some embodiments of the invention to provide a method where the first angular orientation (θ-1) resulting in maximum reflection from a malignant tumor is determined experimentally and theoretically It is another object of some embodiments of the invention to provide a method where the tissue of the patient is breast tissue.

It is an object of some embodiments of the invention to provide a system for detection and differentiation of tumors in tissue, the system including a computing device comprising at least one processor and a non-transitory computer-readable storage medium and a scanner comprising: a housing, a Doppler radar for emitting an electromagnetic (EM) beam and for receiving reflected signals from the EM beam contacting tissue of a subject, a waveguide for guiding a path of the EM beam, and a rotation-adjustable linear polarizer mounted at an exit of the waveguide for polarizing the amplified EM beam, to generate a linearly polarized EM beam having an energy beam polarization plane at an angular orientation (θ) in relationship to a velocity vector of the energy beam, where the scanner is connected to the computing device, and the processor is programmed to carry out operations, the operations comprising: receiving from the scanner information regarding the received reflected signals from the EM beam contacting tissue of a subject, identifying a region of the breast tissue having relatively higher reflectivity as a potential malignant tumor, determining whether a strength (Z) of the reflected signal from the energy beam at a second polarization plane angular orientation (θ-2) directed at the potential tumor is greater than a strength (Y) of the reflected signal from the energy beam at a first polarization plane angular orientation (θ-1) directed at the potential malignant tumor, and when Z>Y, determining that the potential malignant tumor is a benign tumor, and when Y>Z, determining that the potential malignant tumor is a malignant tumor.

It is another object of some embodiments of the invention to provide a system where the scanner further includes one or more reflection attenuation plates for minimizing reflection of signals from the EM beam inside the scanner.

It is another object of some embodiments of the invention to provide a system where the scanner further includes a movable beam-guiding device for adjusting a focal distance of the EM beam. It is another object of some embodiments of the invention to provide a system where the movable beam-guiding device is a prolate spheroid that conducts the EM beam around its surface and concentrates the EM beam in a point source at a tip of the prolate spheroid.

It is another object of some embodiments of the invention to provide a system where the scanner further includes a motor connected to a rotary arm that holds the linear polarizer, and an amplifier for amplifying the EM beam, to generate an amplified EM beam, where the Doppler radar, waveguide, linear polarizer, motor and rotary arm are disposed within the housing.

It is an object of some embodiments of the invention to provide a method of detection and differentiation of tumors in tissue, the method including emitting a linearly polarized electromagnetic (EM) beam at tissue of a subject, receiving reflected signals from the tissue, adjusting a polarization plane angular orientation θ of the EM beam to one or more angular orientations θ* that correspond to one or more types of tumors, and identifying a region in the tissue that has a tumor when reflected signals from the region are stronger than other reflected signals from other regions of the tissue, where the one or more types of tumors comprise malignant tumors, and wherein the one or more angular orientations θ* comprise a first angular orientation determined to result in stronger reflection signals from malignant tumors than from other tissue.

It is another object of some embodiments of the invention to provide a method where the one or more types of tumors further comprise benign tumors, and wherein the one or more angular orientations θ* further comprise a second angular orientation determined to result in stronger reflection signals from benign tumors than from other tissue, further comprising diagnosing the tumor as malignant or benign based on comparing strength of reflected signals from the region at the first and second angular orientations.

The present disclosure relates to reflection radar-based tomography. The system in some embodiments uses a continuous wave compact Doppler radar transceiver, which is a monostatic system that uses the same antenna to perform both the transmitting and receiving of the signals. The Doppler transceiver emits a linearly polarized EM energy beam. The Doppler radar is rotated about the Scanner's center of rotation at some radial distance from the center of rotation. The transmitted microwaves EM energy penetrates breast tissues and the reflected signals are returned to a receiver. The returned signals are confined to a narrow band of a low frequencies resulted from the Doppler shift which are recorded by a computer sound card. The fundamental aim of this method is the detection and differentiation of malignant and benign tumors having distinctive dielectric constants.

In accordance with the teaching of the present invention, a process of an early cancer detection and diagnosis is disclosed, which exploits the fact that a dielectric material, as for example, a cancerous or benign tissues have dipoles, an electric charge carriers that can be displaced by the electric field. Throughout the disclosure, the example of breast cancer detection and diagnosis is used. However, the same principles can be applied to the detection and diagnosis of liver and thyroid cancers, among others. Furthermore, the detection of tumors is only one medical application of disclosed systems for the detection and differentiation of materials having different dielectric characteristics, which takes advantage of the differing dielectric constants of benign and malignant tumors and non-cancerous tissue. Such systems can also be used in many non-medical applications, one example being the detection of termites inside the wooden frame of houses (wooden framing material having different dielectric characteristics than termites).

The dielectric constant ($\varepsilon'$) of the tissue (or other material, in other applications) expresses the orienting effect of the electric field, with the component of polarization inside the tissue, which follows the electric field.

The dipole moment (p) acquired by the polarizable unit during the process of polarization and the intensity E of the electrical field, acting on it is given by: $p=\alpha E$ Where a is the polarizability, which reflects the properties of material and its individual polarizable units.

Polarizability is independent of the dielectric volume. During the EM source motion above the tested area, the electric field E will induce torque (p) on the electric dipoles within the breasts' various tissues, and the dipoles will rotate toward the alignment with the electric field causing orientation polarization to occur. Because the same field intensity E is applied to all the tissues in the beam path, the rotation of the dipoles of each tissue will be corresponding to that tissue's dielectric constant ($\varepsilon'$).

The breast is illuminated with a rotation-adjustable linearly polarized microwave beam, which is set to the angle θ* corresponding to the rotation of the dipoles of the selected tissue, induced by the electric field E.

Therefore, by changing the angular orientation θ of a linearly polarized beam, in relationship to the source's velocity vector, based on the material's dielectric constant ($\varepsilon'$), will tune the system for the maximum reflection of the beam from this material back to the sensor's receiving antenna. This mechanism is also suppressing the return signals from the rest of the breast tissues.

*—Angles θ for breast tissues may be established during the system calibration.

Embodiments of this invention transform the existing breast screening based on the image interpretation, which is prone to misdiagnoses, to a ground-breaking automated process of cancer detection and diagnosis all in one system. Because the technology relies on the physics of the process intrinsic to the system's design, and not on the image interpretation, the probability of misdiagnoses are much less likely.

The Doppler radar, in some embodiments of the invention, rotates about the device's center of rotation, radiates a linearly polarized microwave EM beam guided by a waveguide. A rotation-adjustable linear polarizer is installed on the beam path at the end of the waveguide.

The detection of a tumor of interest is achieved by rotating the linearly polarized EM beam in the relationship to its velocity vector, above the tested area, to the angle unique to the dielectric constant of a particular tissue of interest. The tumor detection happens when the Doppler sensor passes above a tumor.

There are a number of embodiments of the rotatable linearly polarized EM source around the device's center of rotation that are possible:

1. A linearly polarized microwave EM source is installed at the end of the arm rotatable about the device's center of rotation and radiates a linearly polarized microwave EM beam guided by a waveguide. A linear polarizer is installed on the beam path at the end of the waveguide. The linear polarizer is rotation-adjustable in the relationship to the velocity vector of the EM source above the tested area to the angle unique to the dielectric constant of a particular tissue of interest.
2. A linearly polarized microwave EM source is installed at the end of the arm rotatable about the device's center of rotation and radiates a linearly polarized microwave EM beam guided by a waveguide. A linearly polarized microwave EM source is rotation-adjustable in relationship to the velocity vector of the EM source above the tested area to the angle unique to a dielectric constant of a particular tissue of interest. For this embodiment, there is no need in a linear polarizer at the end of the waveguide.
3. A circularly polarized microwave EM source is installed at the end of the arm rotatable about the device's center of rotation and radiates a circularly polarized microwave EM beam guided by a waveguide. A linear polarizer is installed at the end of the waveguide and is rotation-adjustable in the relationship to the velocity vector of the EM source above the tested area to the angle unique to the dielectric constant of a particular tissue of interest.
4. The above-described embodiments 1, 2, and 3 of this invention can be used in the arrangement when the EM source moves in a linear, reciprocal motion above the tested area. This can be achieved by installing the rotation-adjustable EM source in the middle of the linear stage or installing two EM sources each at the ends of the linear motion stage. The linear stage will move reciprocally back and force above the tested area at the desired linear velocity in order to achieve the required Doppler effects when passing above the target of interest.

This invention in some embodiments incorporates a method of improving the system's signal-to-noise ratio by reducing the EM beam stray reflections within the scanner enclosure.

This may be achieved by the introduction of the device for the attenuation of microwave reflections from the surfaces inside the scanner's enclosure. These reflections create a background noise that reduces the system's signal-to-noise ratio. The device is shown in FIG. 6. It consists of two dielectric parallel plates spread apart to the distance equal to one quarter of the EM source' wavelength (7 mm), which is in the current embodiment, is 28 mm wavelength.

The dielectric plate facing the incoming internal reflections (18) has no conducting coating, but the plate parallel to it, which is the bottom cover (19) of the Scanner, has a conductive coating (20) in the area under the path of the EM beam source. This arrangement entraps the incoming stray beams thus reducing the system's noise level and increasing its overall signal-to-noise ratio. The device was built and tested in the system with excellent results.

Embodiments of this invention also incorporate beam-focus adjustment functionality for detecting the depth of the discovered tumor by bringing the tumor to the focal position. This may be achieved by means of a movable beam-guiding device in the shape of a prolate spheroid, FIG. 6, detail 21. The movable beam-guiding device is conducting the EM beam, from the Doppler radar EM source, around its surface and concentrating it in the point source at its tip. By moving this movable beam-guiding device in the relationship to the focal distance of the microwave lens (FIG. 3, detail 10). This allows for the exit beam convergence and thus provides the adjustment of the beam's focal distance.

In some embodiments of this invention, the tumor detection and diagnosis is accomplished by the rotational motion of a Doppler transceiver module above the material being tested. As the EM source is rotated around the device's center of rotation and at its distance from the center, the Doppler Effect produces modulations of frequency and amplitude of the MW beam reflected from a dielectric tissue of interest. The reflected beam's frequency and amplitude are the function of angular velocity and the power of the reflected microwave, respectively.

In one embodiment, the invention may comprise a method of detecting the presence or absence of a tumor within a breast and then evaluating its malignant or benign nature, comprising the following steps:

a. The system's scanner is positioned above the patient's breast area of interest with the patient in the supine position. The Doppler radar transceiver moves circularly around its center of rotation at some distance from the center of rotation; it illuminates the breast with the linearly polarized microwave beam from a single source Doppler radar transceiver in multiple locations of the breast.

b. It records the received reflections from various points of the breast in the form of frequency and amplitude modulations in time domain.

c. The invention's radar-based microwave low power, linearly polarized radiation directing the beam through a waveguide and a beam forming and focusing microwave optics; the beam is exiting through a rotatable linear polarizer used for rotating the incoming polarized beam to the unique angle corresponding to the dielectric constant of the tumor under investigation;

d. A rotatable linear polarizer is set to the angle unique to the dielectric constant of the tumor to be detected; the polarizable tissue of the tumor will align itself to this preset angle. This allows the delivery of maximum reflected energy back to the receiving antenna, while reflection from other tissues of different dielectric constants will not be able to align them to the above-mentioned preset angle.

e. Setting the Scanner, by means of a Positioning Sensor, such that the Scanner is close to the patient's skin but not touching it and the impingement of the beam at the skin surface is close to the normal to the curved area of the breast location under investigation; this area can be called an Active Window.

f. Produce a First Scan, using the Positioning Sensor, at the location least expected to have a tumor (between the 3d and the 4th quadrants of the breast) to establish the background noise level, which includes the combined reflections of the skin, adipose (fat) and fibroglandular tissues. The signals from the background noise are averaged within the Active Window. The averaging the background signals within the Active Window allows using the obtained average as a red-line line in the computer GUI screen graph as a background noise signal level;

g. All scan files in the described embodiment are recorded in a WAV file format of a sound card.
h. Produce a Second Scan, using the Positioning Sensor, in the area that is the most likely to have a tumor (the first and the second quadrants); if the signal on the GUI screen had not passed the red-line and the Red LED did not lit, move the Scanner in other quadrants of the breast to insure that the breast is tumor free. If the Red LED did lit up, press the Control Button on the Scanner to capture the detected tumor, and input to the GUI the location of the detected tumor. The captured signals with the amplitude above of the red-line on the screen trigger the Red LED on the Scanner to lit up indicating the presence of a tumor.
i. The final WAV file is derived by the subtraction of the First Scan (the background noise) signals from the Second scan (the discovered tumor) signals. This final WAV file is saved and used by the system's imaging and control programs.
j. If the Second Scan had discovered a tumor, the tumor is checked for its nature. The steps f to h are repeated at the position of the discovered tumor, with the GUI set for a benign tumor test. The resulted test will show the image of the same tumor on the screen and its calculated size, if the size is smaller than the size calculated after the malignant test, it means that the tumor is malignant and the message on the screen will report that the tumor is malignant; else, it will report that the tumor is benign. Again, the data and the result will be saved into the patient's folder. The malignant tumor detection and diagnosis may be performed as following:
k. The initial scan is the breast background noise scan, at this scan the Scanner is placed above the area of the breast that has the least probability of having malignant tissues, i.e., at the border of the 3d and 4th quadrants of the breast FIG. 5. This scan establishes the position of the redline on the GUI screen. Only the signals of the tissue of interest set by the operator will raise above this redline, triggering the red LED and the operators pressing the green control button of the Scanner.
l. After the initial scan, the operator moves the scanner to the locations of interest for malignant tumor search. The First scan is tuned for a breast Malignant Tumor, ε'=54. Upon the tumor detection the tumor's image is displayed, the System calculates the tumor size and inputs it to the GUI (Graphic User Interface) screen; the Operator inputs the detected, potentially malignant, tumor location into the GUI and saves the information. FIG. 7.
m. The Second scan is set for a benign tumor test to verify that the discovered tumor is indeed malignant. The operator selects Application for Benign Tumor ε'=14 and scans the location of the discovered tumor. The System evaluates and compares the results with the Malignant Test and automatically determines if the tumor is malignant or benign. The strongest signal (the larger tumor size) of the two indicates the malignant or benign nature of the discovered tumor. The diagnosis is displayed on the GUI screen, FIG. 8.

These and further and other objects and features of the invention are apparent in the disclosure, which includes the above and ongoing written specification, as well as the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 1 is a photograph of a fully operational breast tumor detection and diagnostics system based on this invention. It consists of main modules including the Scanner-1, Controller and Power supply-5 with an umbilical cord-4 connecting scanner with the Controller, and Computer-6, connected to Controller with an USB cord. The system has been tested on mimicking breast cancer malignant and benign tissues, with favorable results.

FIG. 2 is a 3D model of the system's Scanner-1 in its scanning position of a breast-14 using a three-laser-beams Positioning Sensor.

FIG. 3 is 3D model of the waveguide-13 housing the microwave optics-10 performing beam forming and focusing; at the end of the waveguide, there is the invention's tissue tuning mechanism consisting of a linear polarizer-11 held by the rotary arm-12 and driven by the servomotor 8 through the arm-9 to a desired angular position.

DETAILED DESCRIPTION

Figure 5:
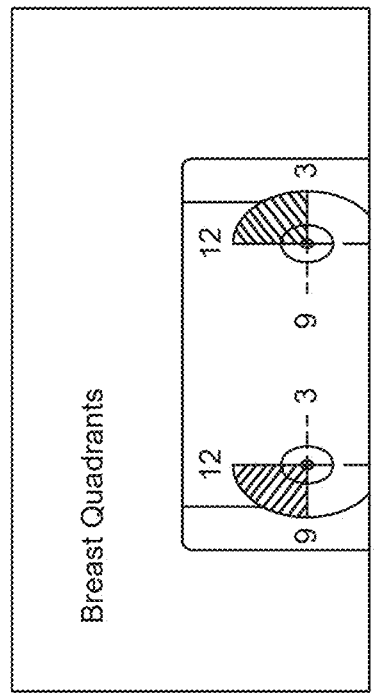
FIG. 5 is the industry accepted way of recording the location of the discovered tumor on a human breast. This method is used by our Graphic User Interface for recording the location and the position of the discovered tumor.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. The fact that steps may be labeled with numbers or letters does not imply that these steps can be performed in only one order. Rather, in alternative embodiments the steps may be performed in any possible order regardless of the steps' labels.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The present invention in embodiments delivers a method and apparatus for tuning a microwave Doppler radar-based breast scanning process to a tumor of interest having a unique dielectric constant, thus maximizing the reflected energy and permitting the tumor detection and then differentiation between the tumor's malignant or benign nature.

This tumor detection and differentiation method may be achieved by means of rotating the transmitted linearly polarized beam by means of a rotatable linear polarizer, installed on the path of the transmitted linearly polarized beam, to the angle unique to a dielectric constant of a particular tissue of interest.

The rotation-adjustable linear polarizer, installed preferably at the exit of the transceiver's waveguide, rotates the transmitted linearly polarized beam to the angle unique to the dielectric constant $\varepsilon$ and the polarizability $\alpha$ of the tumor of interest. The dielectric constant of the material represents the orienting effect of electric field, with the component of polarization, which follows the electric field.

Thus, the positional orientation of a linear polarizer in relationship to the plane of incidence of the beam can be tuned, based on the material's dielectric constant, for the maximum reflection of the beam back through the linear polarizer to the sensor's receiving antenna.

The apparatus embodiment of the present invention that is being described does not intend to limit the claimed invention. The preferred method of patient's scanning either is with a hand-held Scanner as shown in FIG. 2 or with an assistance of an articulated arm attached to the Scanner. The Scanner is designed to be placed above the breast with the help of a Positioning Sensor, as shown in FIG. 2 with the patient in the supine position. No gel or any other coupling media between the Scanner and the patient's breast is required. Because the invention tuning capability amplifies the signal of the tissue of interest and suppresses the reflections of all other tissues, the invention eliminates any need in the injection of contrasting agents into the patient's bloodstream, as is used by competing technologies.

The microwave radiation source may be an inexpensive, low power continuous wave microwave Doppler radar such as an X-Band Doppler transceiver (FIG. 3) which is transmitting a linearly polarized beam. The Doppler radar is attached to a disc rotatable by the shaft of motor 17, FIG. 2. The Doppler radar rotates circularly around the disc's center of rotation and at the radius of about 75 mm from the center of rotation.

ADDITIONAL DESCRIPTION OF EMBODIMENTS OF THE INVENTION

The motor rotates the Doppler transceiver, with the waveguide and optics assembly inside the scanner enclosure (FIG. 1) above the tested area. While the EM source is passing above a tumor, the transmitted linearly polarized beam, with electric field E, is impinged on the tested surface. The electric field E will induce exercise torque T on the electric dipoles inside of dielectric tissues, and the dipoles will rotate toward the alignment with the electric field causing orientation of the electric dipoles inside a breast. The Doppler Effect produces modulations of frequency and amplitude of the reflected EM beam as a function of the EM source angular velocity and the power amplitude of the reflected microwave.

A dielectric material has dipoles, electric charge carriers that can be displaced by the electric field. The dielectric constant ($\epsilon'$) of the tissue expresses the orienting effect of the electric field, with the component of polarization, which follows the electric field.

The dipole moment (p) acquired by the polarizable unit during the process of polarization and the intensity E of the electrical field, acting on it is given by:

$$p = \alpha E \tag{1}$$

where $\alpha$ is the polarizability, which reflects the properties of material and its individual polarizable units. Polarizability is independent of the dielectric volume. Each dielectric mechanism has a characteristic "cutoff frequency". As frequency increases, the slow mechanisms drop out leaving the faster ones to contribute to ($\epsilon'$). The magnitude and "cutoff frequency" of each mechanism is unique for different materials.

Figure 4:
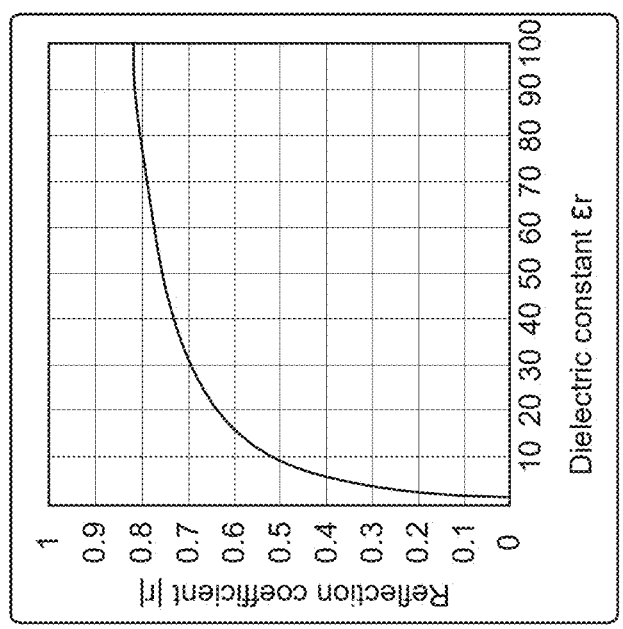
FIG. 4 is a graph showing the dependency of the tissue reflection coefficient on the dielectric constant of the reflecting tissue.
Figure 6:
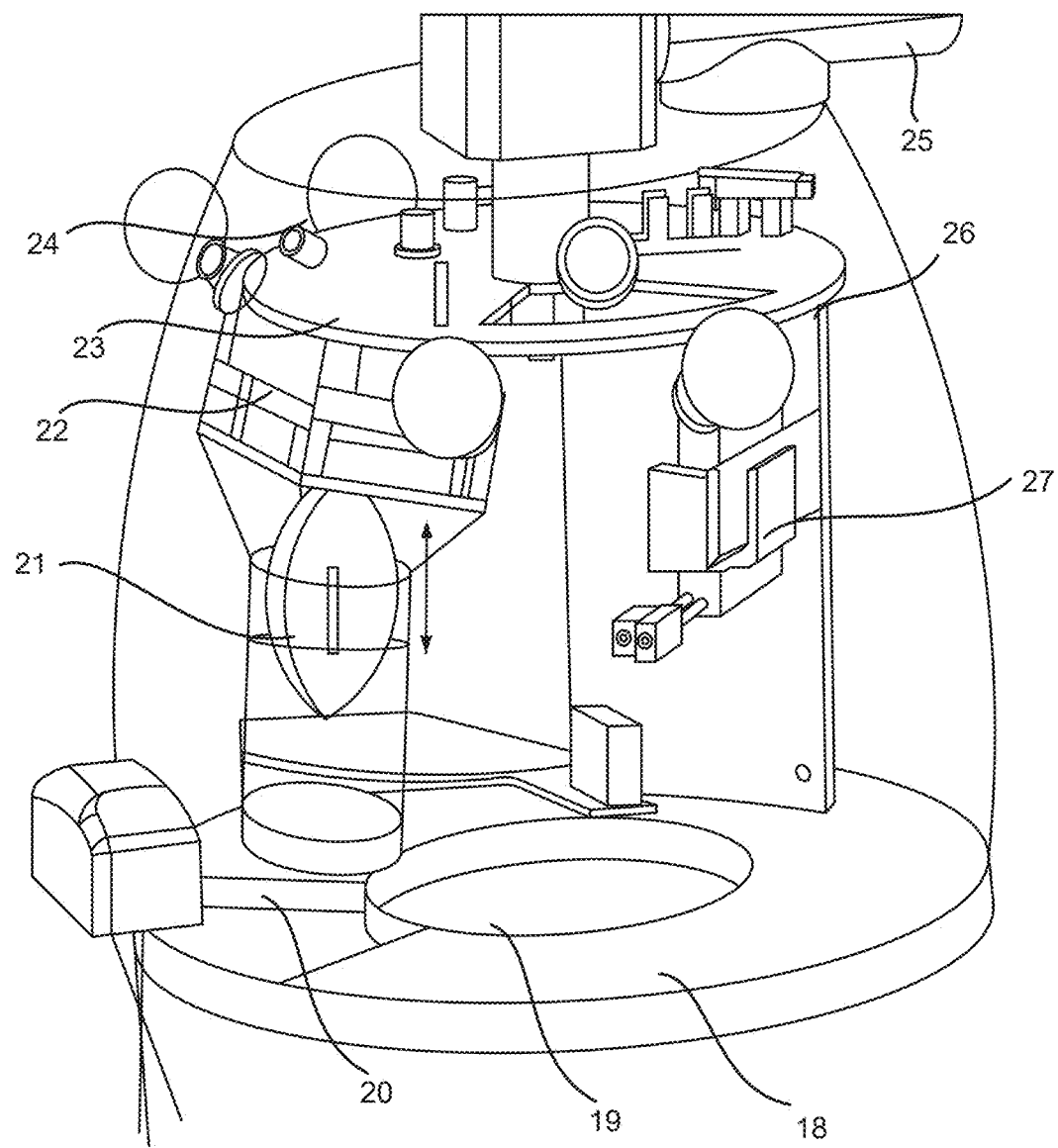
FIG. 6 is a 3D model of the Attenuator of Microwave Reflections with the top dielectric plate-18, the bottom dielectric plate-19 coated with the conductive layer-20 as shown on the 3D drawing. Part 21, a movable beam-guiding device used for beam focusing. Part 22, Doppler transceiver. Part 23, Doppler transceiver amplifier. Part 24, rotary disc. Part 25, umbilical cord housing. Part 26, electronic PCB holder. Part 27, battery.
Figure 7:
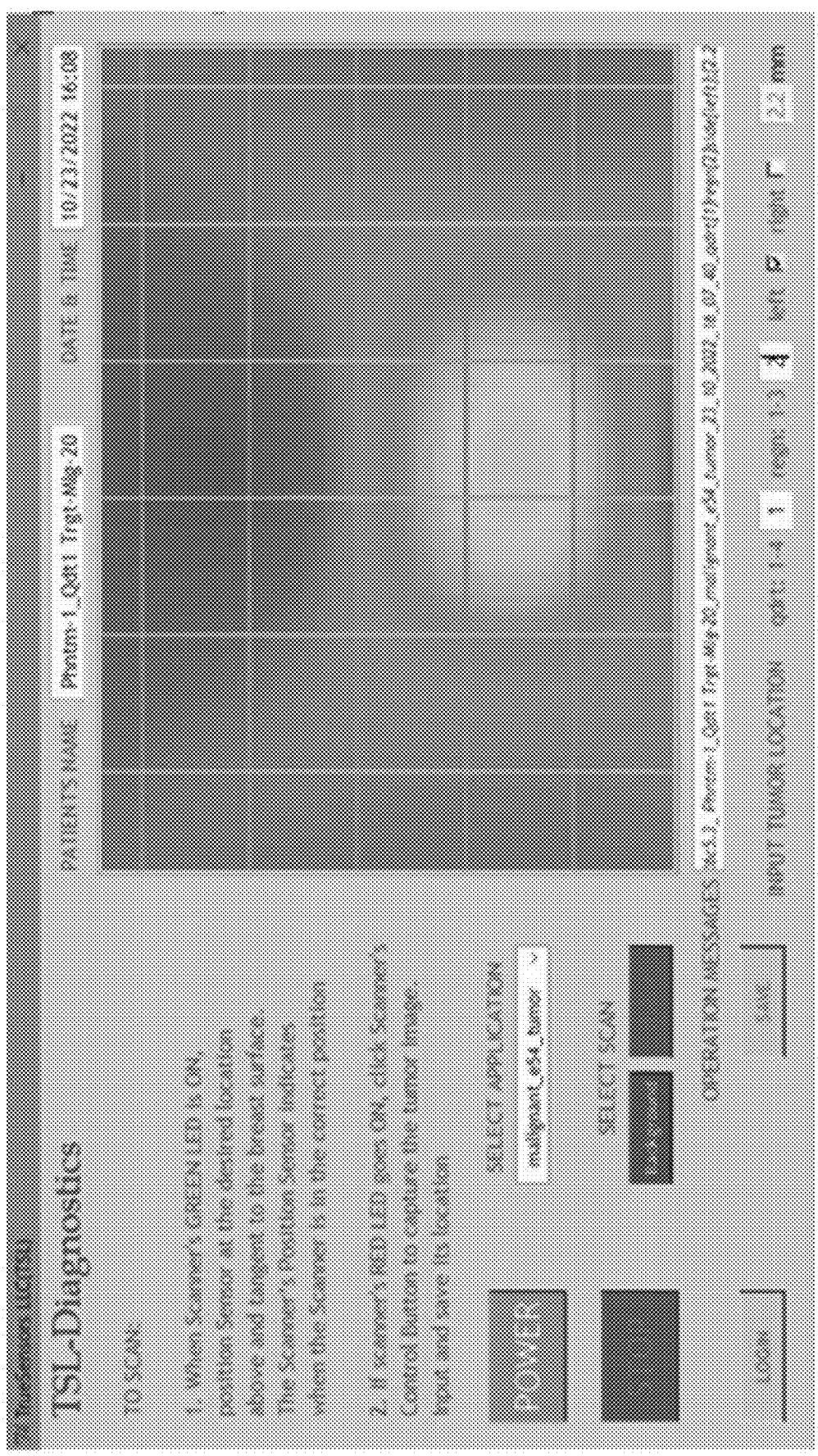
FIG. 7 is the GUI screen resulted from the First scan, which recorded the detection of about 2.5 mm malignant tumor inserted into a glandular tissue of a heterogeneous breast phantom.
Figure 8:
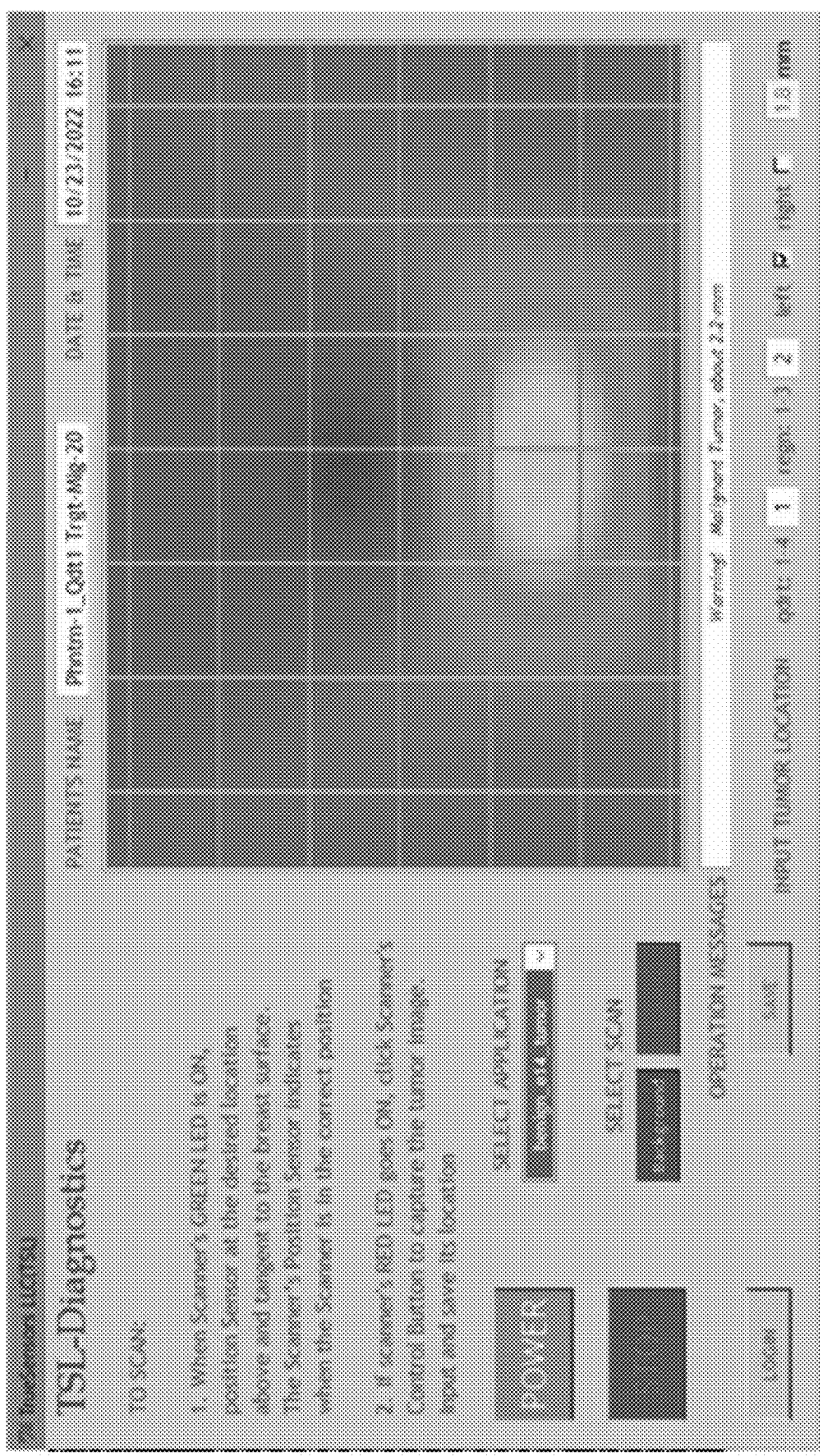
FIG. 8 is the GUI screen resulted from the Second scan set for a benign tumor test, which recorded the detection of the discovered tumor during the malignant tumor scan, compered the results and reported the diagnosis.

As the polarizability $\alpha$ is a function of the dielectric constant ($\epsilon'$) of the material and the intensity E of the electrical field, the polarization will result in the increase of the material's dielectric constant and thus its reflectivity. The reflectivity of a material is directly proportional to its dielectric constant, FIG. 4.

Because the same field intensity E is applied to all the tissues in the beam path, the rotation of the dipoles of each tissue will be corresponding to that tissue's dielectric constant ($\epsilon'$).

Figure 9:
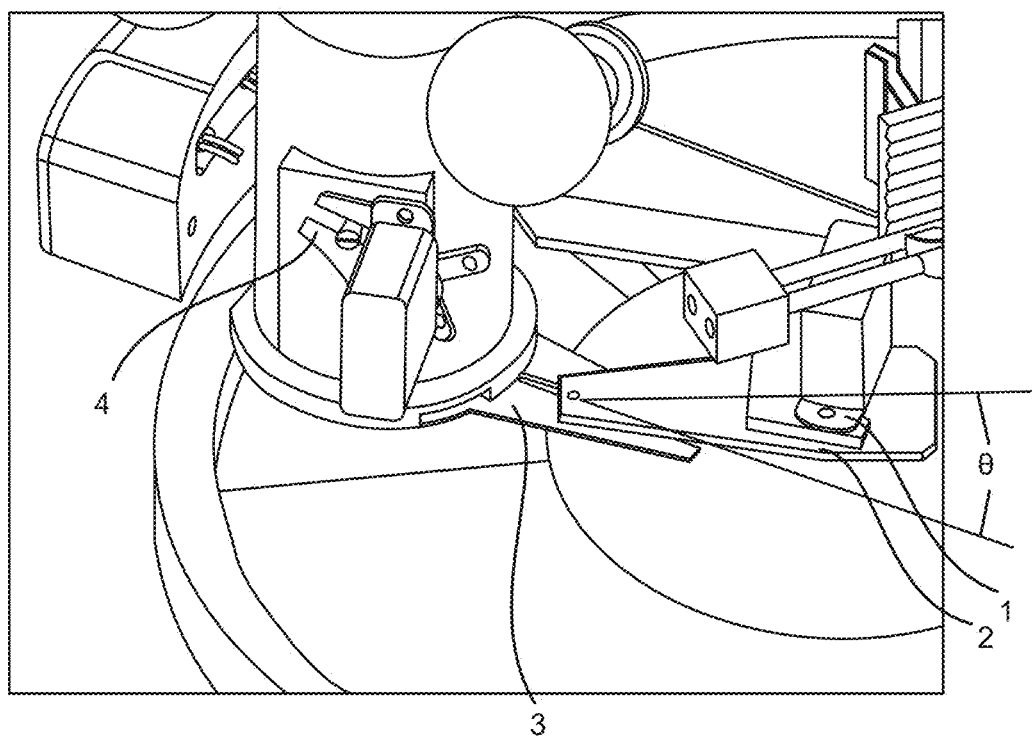
FIG. 9 is model of positioning mechanism for a linear polarizer and a beam focusing component.

The tested area is irradiated with a rotation-adjustable linearly polarized microwave beam, which can be set with the wire-grid linear polarizer within the housing 3, FIG. 9, to the pre-determined angle $\theta$ corresponding to the rotation of the dipoles of the selected tissue, induced by the electric field E.

Hence, by changing the angular orientation $\theta$ of a linearly polarized beam, in relation to the EM source's velocity vector, based on the tissue's dielectric constant ($\epsilon'$), will increase the tissue's dielectric constant ($\epsilon'$) and consequently its reflectivity.

Therefore, this process is tuning the system for the maximum reflection of the beam from this material back to the sensor's receiving antenna. This mechanism, by the above definition, is also suppressing the return signals from the rest of the breast tissues.

Angles $\theta$ for breast tissues may be established during system calibration.

Example System Calibration, Determination of $\theta$ Angles for Various Tissues FIG. 9 shows the positioning mechanisms of the linear polarizer and the beam focusing. The positioning of the linear polarizer detail 11, FIG. 3, positioned within the housing, detail 3, FIG. 9, rotatable around the waveguide, detail 13, FIG. 3, to the desired $\theta$ angle is performed by means of a slider mechanism driven by a servomotor. The system's control program activates servomotor, detail 1, and through the servo-horn, detail 2, FIG. 9, rotates the polarizer housing, detail 3 to the $\theta$ angle correlated with the desired application i.e., malignant or benign tumor tests.

Another function shown in FIG. 9 is the System's beam focusing adjustment. This feature operates by a similar slider mechanism driven by a Servomotor through a servo-horn, detail 4, FIG. 9, which drives an optical component within the Waveguide, thus changing the beam convergence angle exiting from the lens detail 10, FIG. 3, and its focal distance. This feature allows determining the depth of the discovered tumor from the skin surface by automatically changing the focal point positions until the discovered tumor produces the strongest signal, which would indicate its position along the beam path.

Example System Calibration

In some embodiments, the angle $\theta$ for a tissue of interest, for example, a breast cancer tissue ($\epsilon'=54$) may be determined by scanning a known volume of the cancer mimicking tissue placed into a hollow glass sphere. The initial test is done on a representative size of the tumor starting from zero $\theta$, which is the position of a linear polarizer wire grid being perpendicular to the plane of linear polarization (the condition of the linearly polarized beam free passing through the wire grid polarizer).

Figure 10:
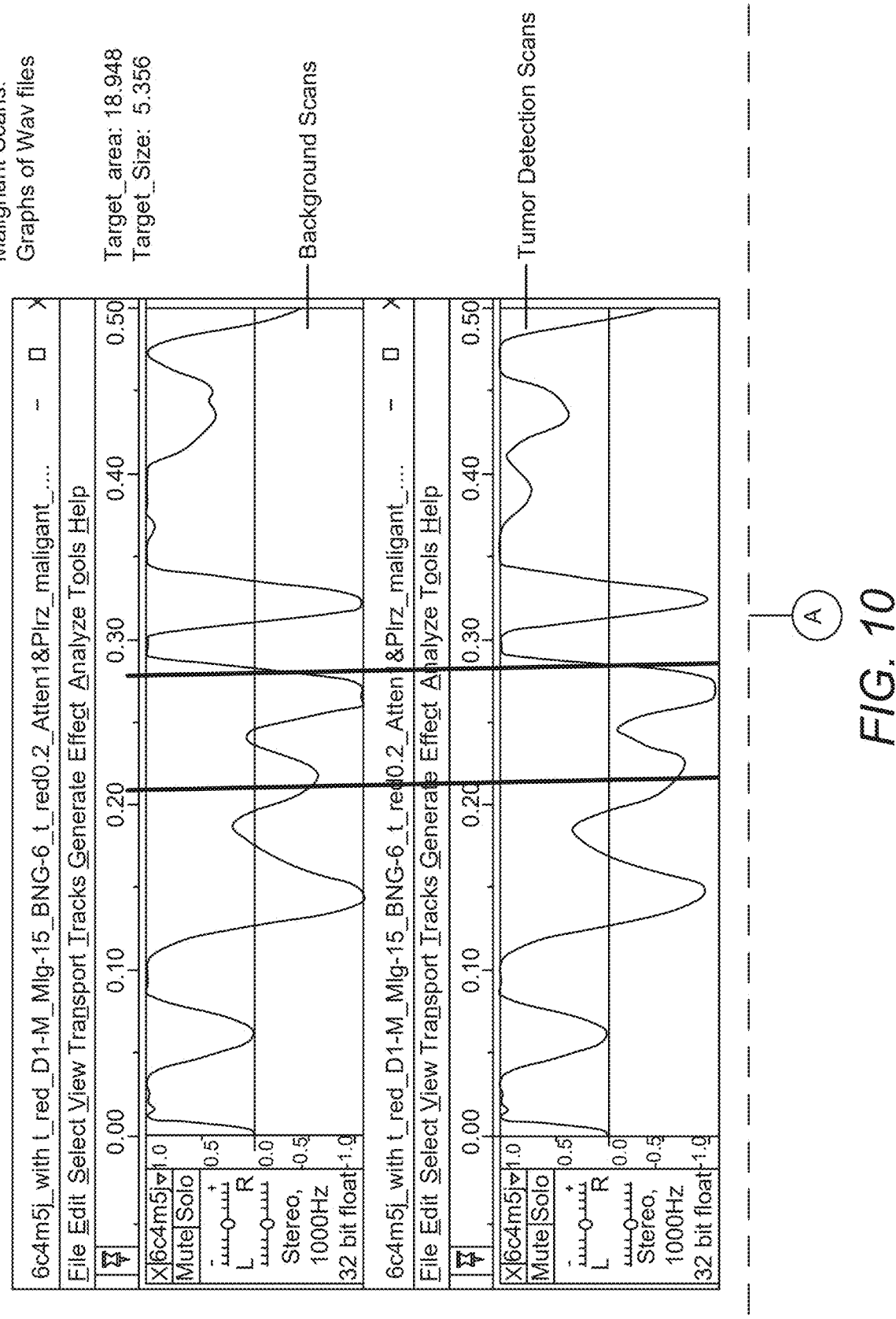
FIG. 10 shows scans for a tumor.
Figure 10:
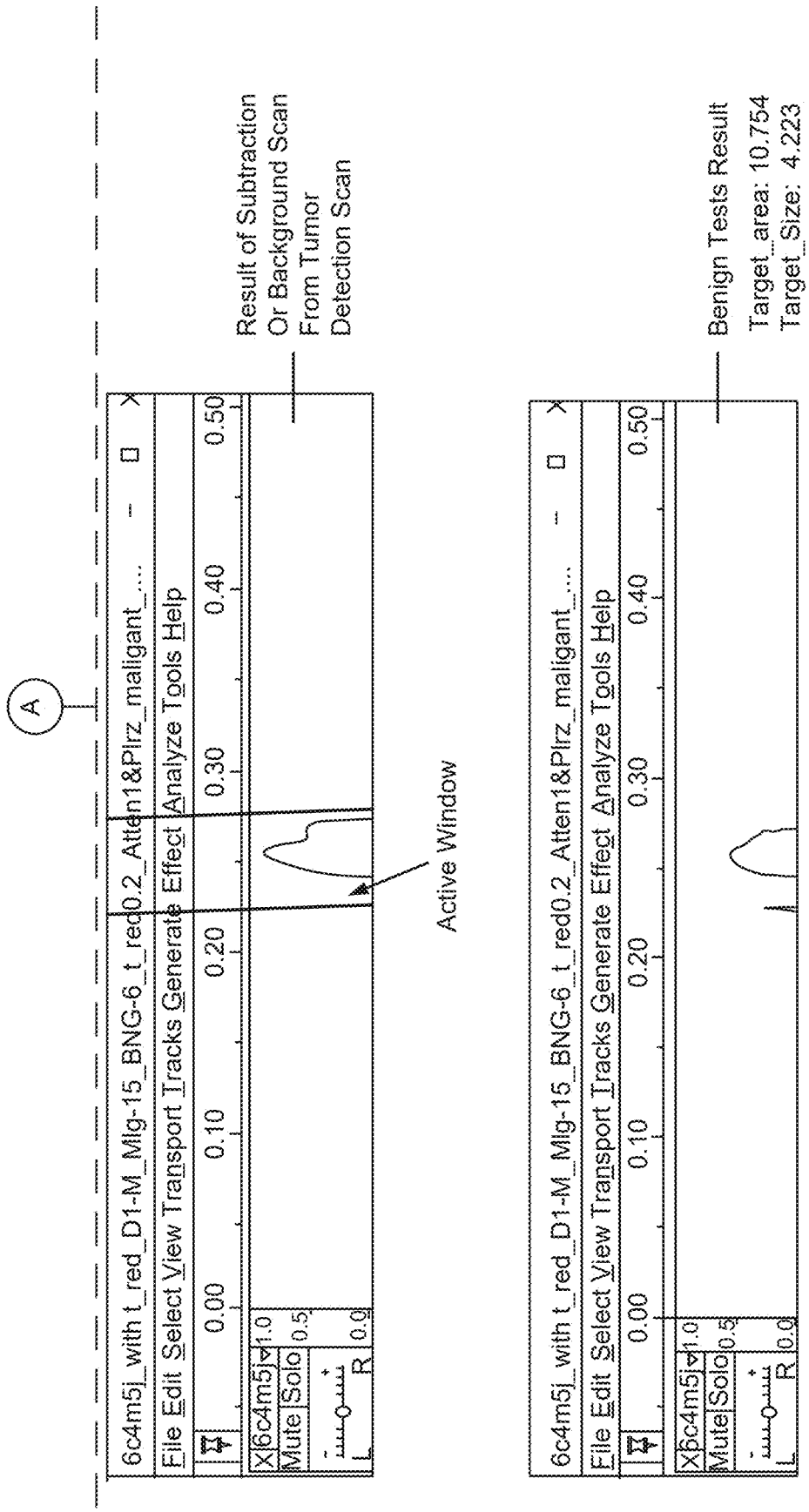

There is no rotation of the plane of polarization that will occur at zero $\theta$ angle. The magnitude of the signal and the Target Area under the signal's curve, within the Active Window of the Subtracted WAV file, are recorded as shown in FIG. 10. This is done for a number of $\theta$ angles, from 0 to 35 degrees with the pitch of 5 degrees. The largest signal derived from the same tumor size under different $\theta$ angles will indicate that the obtained $\theta$ is the optimal angular orientation of the linear polarization corresponding to the $\epsilon'$ of the given tissue.

Derivation of the Equation for the Calculation of Target Size

Figure 11:
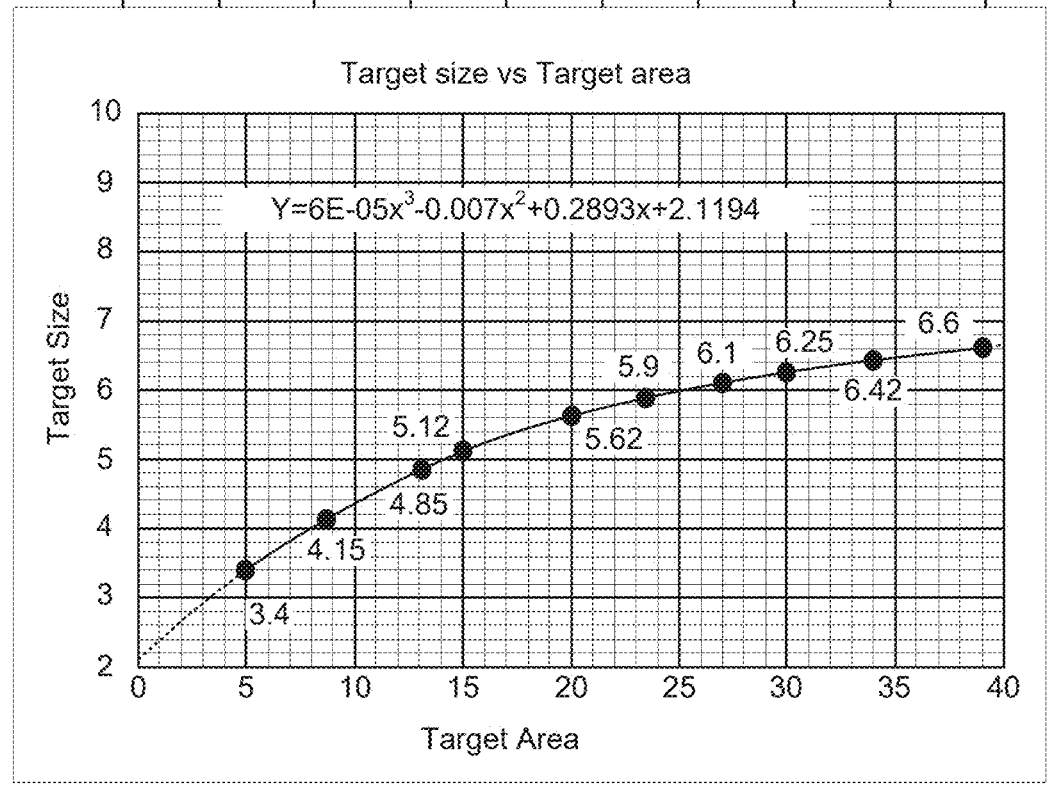
FIG. 11 is a graph of Target size vs. Target Area.
Figure 12:
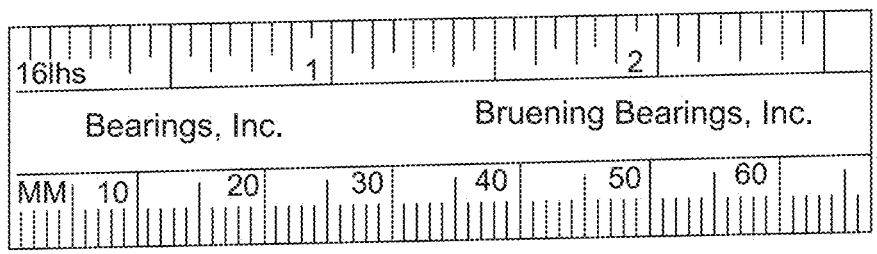
FIG. 12 shows phantom malignant breast tumors.
Figure 12:

By scanning several measured volumes, FIG. 12, of the selected tissue and calculating the target area under the signal's curve of the subtracted WAV file, FIG. 10, associated with the known target size, the mathematical equation, Target size vs. Target Area, FIG. 11, can be derived. It correlates the size of the tumor with the integral of the area under the curve of the signal obtained from the tests of the several sizes, FIG. 12, of the same malignant tissue. The derived equation is introduced into the computer process-control program and is used for the determination of any unknown sizes discovered during the system operation. FIG. 11 below shows the described process for the derivation of the equations during the calibration of the system.

Figure 13:
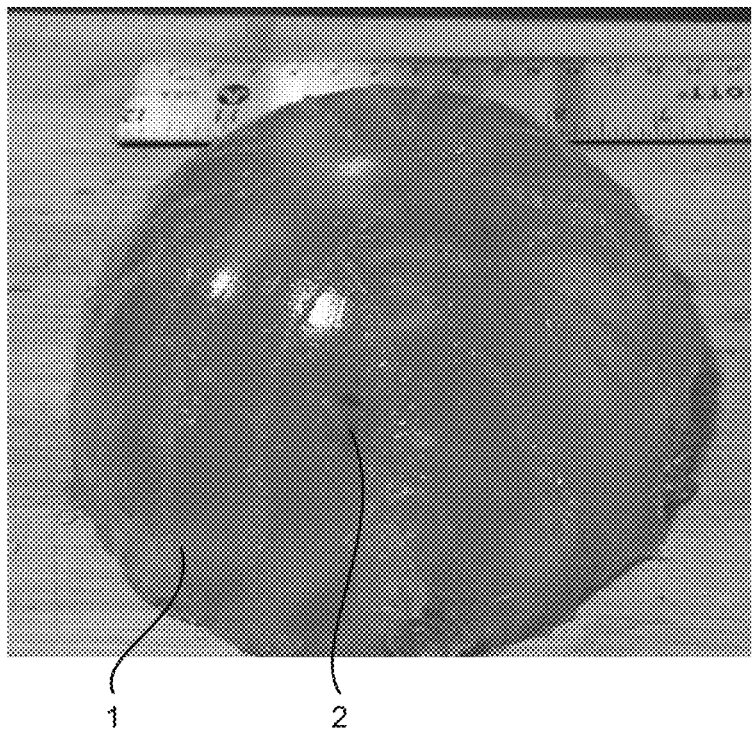
FIG. 13 shows phantom tumors in a phantom breast.

The above-described process was performed on the heterogeneous breast phantom, detail 1, FIG. 13, having a 3 mm malignant tumor, detail 2, imbedded inside of the glandular tissue, detail 3, of the breast phantom. A gelatin-based phantom was produced with an adipose (fat) outside layer (13 mm; $\epsilon'=5$), detail 3, and the glandular core ($\epsilon'=47$), detail 4, FIG. 14. Detail 5, is a mold for the adipose layer and detail 6, FIG. 14, is a mold for the glandular core.

Figure 14:
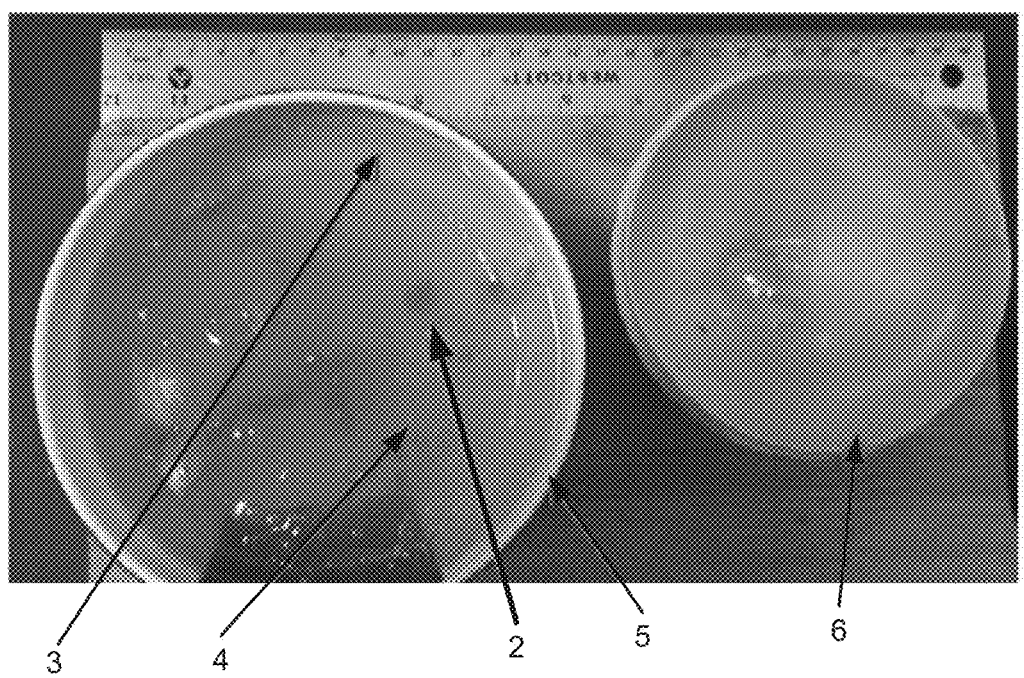
FIG. 14 shows molds for additional portions of phantom tumors in phantom breast.

A hollow glass ball, detail 1, FIG. 12 filled with (glycerin-based) malignant breast tissue ($\epsilon'=54$; 3 mm dia.) was inserted during phantom construction into the glandular core about 30 mm from the phantom surface, detail 2, FIG. 14.

The process of signal data acquisition and signal processing are accomplished as follows:

Example Data Processing

The system's Controller 5, FIG. 1, incorporates a Wi-Fi audio module which provides wireless communication between the Scanner 1, FIG. 1, and the computer 6, FIG. 1 and the exchange of analog data and digital control signals.

It is also used for the control of the system's operation. The analog signals from a transceiver are directly connected to the analog inputs of the Wi-Fi audio module. An opto-switch installed inside of the Scanner 1, FIG. 1, and its enclosure, is used for "homing" the device to its initial position to insure a consistent starting position and the exact position of the Active Window. The computer 6 may be a general-purpose computer, but an application is installed in the computer's memory or the computer is otherwise specially programmed in a known manner for its processor to carry out the various operations described herein.

All scan files in the described embodiment are recorded in a WAV file format of a computer sound card. The frequency response of the Doppler radar is in the range of 5 to 50 Hz, this is within the range of the Doppler radar rotational speed, allowing the data recording in a .WAV file format of a computer sound card.

The Scanner's analog data is received by the computer in the format of an ordinary audio signal. The data is saved for processing by the system's signal processing software in the form of sets of measurements of instantaneous amplitudes of the signals. The software controls the device initialization, noise filtering and other process control operations.

Example Process of Data Acquisition

1) All scans in this invention may be obtained from an area we call Active Window. The Active Window size is established such that the projection of the beam area of rotating Doppler radar onto the curved 3-dimensional surface of the breast under investigation is limited to the area of the breast such that the impinging beam is normal or near normal to the said Active Window area.
2) Using computer's GUI, FIG. 1, input the patient name and select the application for the Malignant Scan.
3) Position the Scanner, with the assistance of the Positioning Sensor 2, FIG. 1, such as shown in FIG. 2.
4) Using positioning of step 3 above, produce the First Scan in the area that is the least likely to have tumors (between the third and the fourth Quadrant of the breast, see FIG. 5) to establish the background noise level which includes the combined reflections of the skin, adipose (fat) and fibroglandular tissues. The signals from the background noise are averaged within the Active Window.
5) Using positioning of step 3 above, produce the Second Scan in the area that is the most likely to have tumors (First Quadrant of the left breast or Second Quadrant of the right breast, see FIG. 5). If, during the scan, the Red LED did not light up, move the Scanner in other quadrants of the breast to insure that the breast is tumor free. If the Red LED did light up, press the Control Button 16, FIG. 2, to capture the detected tumor, and input to the GUI the location of the detected tumor filling the boxes in the GUI screen. The image of the detected tumor will show on the computer's GUI screen in approximately 15 seconds after detection, including the program calculated size of the detected tumor in millimeters.
   a) After pressing the save box of the GUI, all of the information related to this scan, i.e., the patient's name, the date and time, the type of the test, malignant or benign and the tumor size and location are saved and recorded into the patient's folder.
   b) The signals from the Second Scan are averaged within the Active Window. The averaging of the signals within the Active Window of the Second Scan and thresholding it by about 10% above the Zero baseline of the GUI, will become the threshold signal level and red threshold line on the computer GUI screen. Below the Threshold level all the signals are converted to Zero, only the signals above the redline value will be left in their original shape, and value.
6) These signals with the amplitude above the redline of the GUI screen trigger the Red LED 3, FIG. 1 on the Scanner, indicating the presence of a tumor.
7) The final WAV file is derived by the subtraction of the First Scan averages from the Second scan averages. This final WAV file is saved and used by the system's imaging and control programs.
8) If the Second Scan discovered a tumor, the tumor is checked for its malignant or benign nature. The steps 4 to 6 are repeated with the GUI set for a benign tumor test. The resulted test will show the image of the same tumor on the screen and its size, if the size of a benign mode test is smaller than the size shown after the malignant test, the message on the screen will report that the tumor is malignant; else, it will report that the tumor is benign. Again, the data and the results are saved into the patient's folder.

Example Imaging

During the Doppler radar rotational motion, the superposition of the target from the different perspectives is mathematically equivalent to a Radon transform of the target. This Radon transform of the target represents the superposition of all the reflections from the target's points due to scatterers with the same relative velocity lying along the path.

The data collected from the system's continuous wave Doppler transceiver is in the form of a sound card WAV file. The file is processed with a Matlab program using Short time-Fourier Transform (STFT) to extract from the WAV file the data from different perspectives to produce a sinogram, which consists of 3-d data of X axis-frequency, Y axis-time and the Z-axis of relative magnitude of the value of each frequency and time.

Finally, an Inverse-Radon transform is applied to the sinogram in order to reconstruct an image of the target, screen 6, FIG. 1.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method of detection and differentiation of tumors in tissue, the method comprising:
providing a Doppler radar, the Doppler radar being movable over tissue of a patient;
the Doppler radar emitting a linearly polarized electromagnetic (EM) energy beam directed at the tissue, the energy beam having an energy beam polarization plane at an angular orientation (θ) in relationship to the velocity vector of the energy beam;
the energy beam polarization plane being set to a first angular orientation (θ-1) determined to result in maximum reflection from a malignant tumor;
the Doppler radar receiving a reflected signal from the tissue and identifying a region of the tissue having relatively higher reflectivity as a potential malignant tumor;
changing the angular orientation of the energy beam's polarization plane to a second angular orientation (θ-2) determined to result in maximum reflection from benign tumors;
directing the energy beam at the second angular orientation (θ-2) and at the region identified with the energy beam polarization set to the first angular orientation (θ-1) as the potential malignant tumor;
the Doppler radar receiving a reflected signal from the energy beam at the second angular orientation (θ-2) directed at the potential malignant tumor;
determining whether a strength (Z) of the reflected signal from the energy beam at the second angular orientation (θ-2) directed at the potential tumor is greater than a strength (Y) of the reflected signal from the energy beam at the first angular orientation (θ-1) directed at the potential malignant tumor; and
when Z>Y, determining that the potential malignant tumor is a benign tumor, and when Y>Z, determining that the potential malignant tumor is a malignant tumor.

2. The method as in claim 1, further comprising moving the Doppler radar back and forth linearly over the tissue of the patient.

3. The method as in claim 1, further comprising rotating the Doppler radar over the tissue of the patient.

4. The method as in claim 3, wherein:
the Doppler radar is provided on a scanner and rotating the Doppler radar comprises rotating the Doppler radar about an axis of symmetry of the scanner.

5. The method as in claim 4, wherein:
a movable optics-guiding device is provided on a waveguide, wherein the movable optics-guiding device changes a focus of the energy beam for determining the depth of the potential tumor in breast tissue.

6. The method as in claim 4, wherein the scanner is maintained perpendicular to the tissue while directing the energy beam at the tissue.

7. The method as in claim 6, wherein the scanner is maintained perpendicular to a curved surface of the tissue by a positioner that directs three red lasers to a common dot when the scanner is maintained perpendicular to the tissue at an appropriate distance, and no common dot is maintained when the scanner is not perpendicular to the curved surface of the tissue.

8. The method as in claim 1, further comprising adjusting a focal distance of the energy beam while the energy beam is directed at the potential tumor and determining a depth of the potential tumor based on a strength of the reflected signal received at different focal distances of the energy beam.

9. The method as in claim 1, wherein the first angular orientation (θ) is determined by directing the energy beam towards a known volume of material mimicking malignant tumor tissue while varying θ over a range of angles, measuring strength of the reflected signal, and selecting an angle corresponding to the strongest reflection signal.

10. The method as in claim 1, wherein the second angular orientation (θ) is determined by directing the energy beam towards a known volume of material mimicking benign tumor tissue while varying θ over a range of angles, measuring strength of the reflected signal, and selecting an angle corresponding to the strongest reflection signal.

11. The method as in claim 1, wherein a device for the attenuation of microwave reflections from surfaces inside a scanner's enclosure is provided, the microwave reflections creating a background noise that reduces a signal-to-noise ratio.

12. The method as in claim 11, wherein the device for the attenuation of microwave reflections comprises two dielectric parallel plates spread apart a distance equal to one quarter of a wavelength of a source of the EM energy beam.

13. The method as in claim 1, wherein a patient folder is provided to collect data for the patient, the data including data on the tumors in the tissue of the patient and data on detection and differentiation of tumors in the tissue of the patient.

14. The method as in claim 1, further comprising directing the energy beam at a portion of the tissue least expected to have a tumor and receiving the reflected signal from this portion of the tissue to establish a background noise level, and identifying the region of the tissue having relatively higher reflectivity based on the region having a reflected signal at least 10% greater than the background noise level.

15. The method as in claim 14, further comprising subtracting the background noise level from the reflected signals from the potential malignant tumor.

16. The method as in claim 1, wherein the Doppler radar is a Doppler transceiver.

17. The method as in claim 1, wherein further comprising providing a linear polarizer through which the energy beam passes, wherein the linear polarizer is rotated to set the angular orientation of the energy beam polarization plane.

18. The method as in claim 17, wherein the linear polarizer is provided at the end of a waveguide.

19. The method as in claim 1, wherein the Doppler radar is rotatable about its axis, wherein the Doppler radar, emitting the linearly polarized energy beam, is rotated to set the angular orientation (θ) of the energy beam polarization plane.

20. The method as in claim 1, wherein the first angular orientation (θ-1) resulting in maximum reflection from a malignant tumor is determined experimentally.

21. The method as in claim 1, wherein the first angular orientation (θ-1) resulting in maximum reflection from a malignant tumor is determined theoretically.

22. The method as in claim 1, wherein the first angular orientation (θ-1) resulting in maximum reflection from a malignant tumor is determined experimentally and theoretically.

23. The method of claim 1, wherein the tissue of the patient is breast tissue.

24. A system for detection and differentiation of tumors in tissue, the system comprising:
a computing device comprising at least one processor and a non-transitory computer-readable storage medium;

a scanner comprising:
  a housing,
  a Doppler radar for emitting an electromagnetic (EM) beam and for receiving reflected signals from the EM beam contacting tissue of a subject,
  a waveguide for guiding a path of the EM beam, and
  a rotation-adjustable linear polarizer mounted at an exit of the waveguide for polarizing the EM beam, to generate a linearly polarized EM beam having an energy beam polarization plane at an angular orientation ($\theta$) in relationship to a velocity vector of the energy beam,
wherein the scanner is connected to the computing device,
wherein the processor is programmed to carry out operations, the operations comprising:
  receiving from the scanner information regarding the received reflected signals from the EM beam contacting tissue of the subject,
  identifying a region of the tissue having relatively higher reflectivity as a potential malignant tumor,
  determining whether a strength (Z) of the reflected signal from the energy beam at a second polarization plane angular orientation ($\theta$-2) directed at the potential tumor is greater than a strength (Y) of the reflected signal from the energy beam at a first polarization plane angular orientation ($\theta$-1) directed at the potential malignant tumor; and
  when Z>Y, determining that the potential malignant tumor is a benign tumor, and when Y>Z, determining that the potential malignant tumor is a malignant tumor.

25. The system as in claim 24, the scanner further comprising one or more reflection attenuation plates for minimizing reflection of signals from the EM beam inside the scanner.

26. The system as in claim 24, wherein the scanner further comprises a movable beam-guiding device for adjusting a focal distance of the EM beam.

27. The system as in claim 26, wherein the movable beam-guiding device is a prolate spheroid that conducts the EM beam around its surface and concentrates the EM beam in a point source at a tip of the prolate spheroid.

28. The system as in claim 24, wherein the scanner further comprises a motor connected to a rotary arm that holds the linear polarizer, and an amplifier for amplifying the EM beam, to generate an amplified EM beam, wherein the Doppler radar, waveguide, linear polarizer, motor and rotary arm are disposed within the housing.

29. A method of detection and differentiation of tumors in tissue, the method comprising:
  emitting a linearly polarized electromagnetic (EM) beam at tissue of a subject;
  receiving reflected signals from the tissue;
  adjusting a polarization plane angular orientation $\theta$ of the EM beam to one or more angular orientations $\theta^*$ that correspond to one or more types of tumors; and
  identifying a region in the tissue that has a tumor when the reflected signals from the region are stronger than other reflected signals from other regions of the tissue, wherein the one or more types of tumors comprise malignant tumors, and wherein the one or more angular orientations $\theta^*$ comprise a first angular orientation determined to result in stronger reflection signals from malignant tumors than from the other regions.

30. The method as in claim 29, wherein the one or more types of tumors further comprise benign tumors, and wherein the one or more angular orientations $\theta^*$ further comprise a second angular orientation determined to result in stronger reflection signals from benign tumors than from the other regions, further comprising diagnosing the tumor as malignant or benign based on comparing strength of reflected signals from the region at the first and second angular orientations.

* * * * *